(12) United States Patent
Smith et al.

(10) Patent No.: US 10,601,723 B2
(45) Date of Patent: Mar. 24, 2020

(54) BANDWIDTH MATCHED SCHEDULER

(71) Applicant: Advanced Micro Devices, Inc., Santa Clara, CA (US)

(72) Inventors: Alan Dodson Smith, Austin, TX (US); Vydhyanathan Kalyanasundharam, San Jose, CA (US); Bryan P. Broussard, Austin, TX (US); Greggory D. Donley, San Jose, CA (US); Chintan S. Patel, Bee Cave, TX (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 114 days.

(21) Appl. No.: 15/951,844

(22) Filed: Apr. 12, 2018

(65) Prior Publication Data
US 2019/0319891 A1    Oct. 17, 2019

(51) Int. Cl.
*H04L 12/873*  (2013.01)
*H04L 12/841*  (2013.01)
(Continued)

(52) U.S. Cl.
CPC .......... *H04L 47/524* (2013.01); *H04L 47/28* (2013.01); *H04L 47/525* (2013.01);
(Continued)

(58) Field of Classification Search
None
See application file for complete search history.

(56) References Cited

U.S. PATENT DOCUMENTS

| 6,782,461 B2 | 8/2004 | Lam |
| 7,406,554 B1 | 7/2008 | Huffman |

(Continued)

FOREIGN PATENT DOCUMENTS

| EP | 2466476 A1 | 6/2012 |
| WO | WO99/00936 A1 | 1/1999 |

OTHER PUBLICATIONS

Shah et al., "Optimal Queue-Size Scaling in Switched Networks", The Annals of Applied Probability, Sep. 3, 2014, 40 pages, vol. 24, No. 6, Institute of Mathematical Statistics, https://arxiv.org/pdf/1110.4697.pdf. [Retrieved Apr. 2, 2018].

(Continued)

*Primary Examiner* — Jutai Kao
(74) *Attorney, Agent, or Firm* — Kowert Hood Munyon Rankin and Goetzel PC; Rory D. Rankin

(57) ABSTRACT

A computing system uses a memory for storing data, one or more clients for generating network traffic and a communication fabric with network switches. The network switches include centralized storage structures, rather than separate input and output storage structures. The network switches store particular metadata corresponding to received packets in a single, centralized collapsing queue where the age of the packets corresponds to a queue entry position. The payload data of the packets are stored in a separate memory, so the relatively large amount of data is not shifted during the lifetime of the packet in the network switch. The network switches select sparse queue entries in the collapsible queue, deallocate the selected queue entries, and shift remaining allocated queue entries toward a first end of the queue with a delay proportional to the radix of the network switches.

20 Claims, 9 Drawing Sheets

(51) Int. Cl.
    *H04L 12/877*    (2013.01)
    *H04L 12/875*    (2013.01)
    *H04L 12/54*     (2013.01)
    *H04L 12/70*     (2013.01)

(52) U.S. Cl.
    CPC ........ *H04L 47/566* (2013.01); *H04L 12/5602* (2013.01); *H04L 2012/5679* (2013.01)

(56) References Cited

U.S. PATENT DOCUMENTS

| | | |
|---|---|---|
| 7,689,793 B1 | 3/2010 | Solt et al. |
| 9,397,961 B1 | 7/2016 | Bailey |
| 2004/0151197 A1* | 8/2004 | Hui .................. H04L 47/2416 370/412 |
| 2008/0320274 A1* | 12/2008 | Singh .................. G06F 9/3814 712/23 |
| 2010/0318716 A1* | 12/2010 | Nguyen ............. G06F 13/4027 710/314 |
| 2011/0078697 A1* | 3/2011 | Smittle ............... G06F 9/3836 718/104 |
| 2015/0081941 A1 | 3/2015 | Brown et al. |
| 2017/0230269 A1 | 8/2017 | Kamath et al. |
| 2019/0220949 A1* | 7/2019 | Dutta .................. G10L 19/008 |

OTHER PUBLICATIONS

International Search Report and Written Opinion in International Application No. PCT/US2019/026571, dated Jun. 21, 2019, 12 pages.

* cited by examiner

BANDWIDTH MATCHED SCHEDULER

BACKGROUND

Description of the Related Art

In computing systems, some types of applications perform functions that are better able exploit parallel processing and shared memory than other applications. Examples of such applications include machine learning applications, entertainment and real-time applications, as well as some business, scientific, medical and other applications. While some processor architectures include more than one processing unit (e.g., CPU, GPU, etc.) or processing core, one or two additional processing units or cores coupled to a memory may not necessarily provide a sufficient level of parallelism to provide a desired level of performance. In additional, traditional bus-based and crossbar interconnect architectures generally do not scale well as the number of processing units increases. Consequently, as the number of processing units increase, the delay in supplying instructions and data to the processing units also increases.

In order for multi-processing unit systems to support a desired level of performance, some systems have moved from a bus-based and crossbar interconnect architectures to a network on chip (NoC) architecture. A NoC architecture uses system-level network techniques to transfer on-chip traffic. In contrast to a tiered and segmented approach provided by bus-based architectures, NoC architectures provide a more homogeneous, scalable, switch fabric network to transport data. In order to maintain adequate throughput, a NoC switch in the NoC architecture is expected to process a number of packets per clock cycle through its internal structures.

In view of the above, methods and systems for efficiently transferring on-chip network traffic are desired.

BRIEF DESCRIPTION OF THE DRAWINGS

The advantages of the methods and mechanisms described herein may be better understood by referring to the following description in conjunction with the accompanying drawings, in which.

Figure 1:
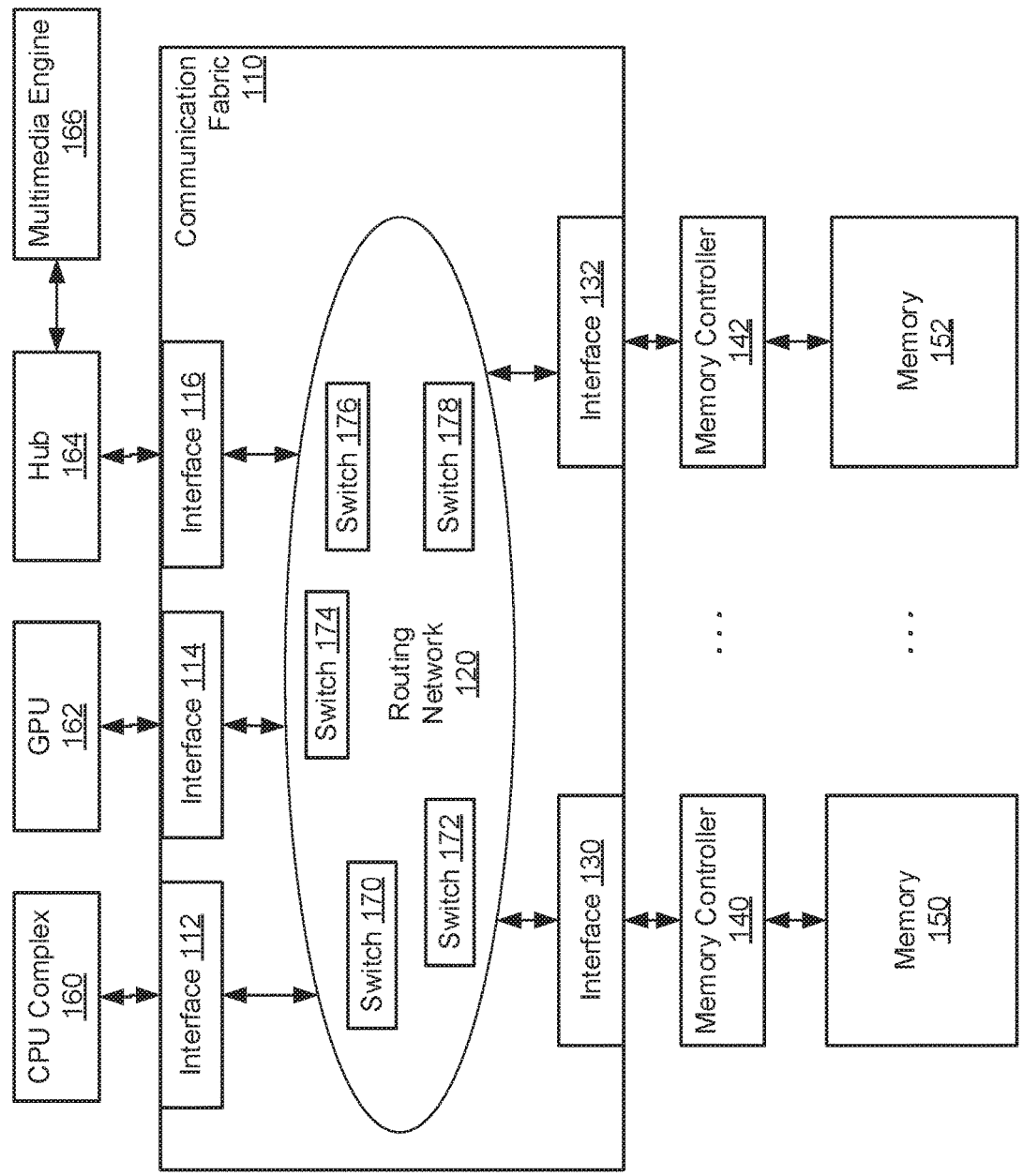
FIG. 1 is a block diagram of one implementation of a computing system.

While the invention is susceptible to various modifications and alternative forms, specific implementations are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the scope of the present invention as defined by the appended claims.

DETAILED DESCRIPTION OF IMPLEMENTATIONS

In the following description, numerous specific details are set forth to provide a thorough understanding of the methods and mechanisms presented herein. However, one having ordinary skill in the art should recognize that the various implementations may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Various systems, apparatuses, methods, and computer-readable mediums for efficiently transferring on-chip network traffic are disclosed. In various implementations, a computing system includes one or more clients. Examples of such clients include a general-purpose central processing unit (CPU), a graphics processing unit (GPU), an accelerated processing unit (APU), a multimedia engine, and so on. These one or more clients generate access requests for the data stored in a memory while processing program instructions. In some implementations the multiple clients are combined in a single die, such as a system-on-a-chip (SOC).

In various implementations, the computing system also includes a communication network (or "fabric") for transferring data between the clients, as well as between memory and the clients. In various implementations, the communication fabric includes network switches which may be viewed as entities configured to receive data from a given source and convey the received data to a given destination. In order to maintain desired throughput, the network switches process up to a number of packets per clock cycle that is equal to a number of packets received in a clock cycle. The number of packets received in a given clock cycle is equal (up to) a number of read ports in the network switch. The number of read ports receiving data is also equal to the number of write ports for the conveyance of data. This number of read and write ports (or switch ports) is also referred to as the "radix" of the network switch. So a network switch with 8 read ports would have a radix of 8.

In some implementations, the network switches include centralized data storage structures, rather than separate input and output data storage structures. Centralized data storage structures avoid redundancy in buffering data. Redundant buffering leads to increases in both on-die area and power consumption. The network switches store metadata corresponding to received packets in a single, centralized, collapsible queue where the age of the corresponding packet corresponds to a queue entry position. In this context, age refers to the time at which the packet was received by the switch. Therefore, the age of the packet is implicit and it is unnecessary to separately store an indication of an age. The payload (data) of the packets is stored in a memory structure separate from the metadata. In this manner, the relatively large amount of data is not also shifted during a collapse of the metadata in the collapsible queue.

In various implementations, the network switches include control logic that selects sparse, or non-contiguous, queue entries in the collapsible queue for deallocation. Two contiguous queue entries are located adjacent to one another, whereas two sparse queue entries have one or more other queue entries located between them. Therefore, two sparse queue entries selected for deallocation have one or more other queue entries between them that are not selected for deallocation. In order to maintain full throughput, the number of queue entries selected for deallocation in each clock cycle equals (up to) the radix of the network switch.

The control logic in the network switches locates and deallocates each of the selected queue entries. The control logic also shifts remaining allocated queue entries toward a first end of the queue such that the remaining allocated queue entries are contiguous. This shift may also be referred to as a "collapse". In the following discussion, the first end is referred to as the head of the queue and the other end is referred to as the tail of the queue. As such, the remaining allocated queue entries that are shifted toward the head of the queue are located in a contiguous manner at the head of the queue subsequent to the shift operation. The entries that are available for allocation after the shift operation are located in contiguous entries at the tail of the queue.

Turning now to FIG. 1, a generalized block diagram of one implementation of a computing system 100 is shown. As shown, the computing system 100 includes communication fabric 110 between each of memory controllers 140 and 142 and multiple clients. Memory controllers 140 and 142 are used for interfacing with memories 150 and 152. Examples of the multiple clients are a central processing unit (CPU) complex 160, graphics processing unit (GPU) 162, and a Hub 164. Hub 164 is used for communicating with Multimedia Engine 166. In some implementations, one or more hubs are used for interfacing to a multimedia player (i.e., Hub 164 for Multimedia Engine 166), a display unit, or otherwise. In such cases, the hubs are clients in computing system 100. Each hub additionally includes control logic and storage elements for handling traffic according to various communication protocols. Although three clients are shown, in other implementations, computing system 100 includes any number of clients and other types of clients, such as display units, one or more input/output (I/O) peripheral devices, and so forth.

In some implementations, the computing system 100 is a system on a chip (SoC) with each of the depicted components integrated on a single semiconductor die. In other implementations, the components are individual dies in a system-in-package (SiP) or a multi-chip module (MCM). In various implementations, CPU 160, GPU 162 and Multimedia Engine 166 are used in a smartphone, a tablet computer, a gaming console, a smartwatch, a desktop computer, a virtual reality headset, or otherwise. The CPU 160, GPU 162 and Multimedia Engine 166 are examples of clients capable of generating on-chip network traffic. Examples of network traffic include memory access requests, memory access responses, and other network messages between the clients.

To efficiently route traffic, in various implementations, communication fabric 110 uses a routing network 120 that includes network switches 170-178. In some implementations, network switches 170-178 are network on chip (NoC) switches. In an implementation, routing network 120 uses multiple network switches 170-178 in a point-to-point (P2P) ring topology. In other implementations, routing network 120 uses network switches 170-178 with programmable routing tables in a mesh topology. In yet other implementations, routing network 120 uses network switches 170-178 in a combination of topologies. In some implementations, routing network 120 includes one or more buses to reduce the number of wires in computing system 100. For example, one or more of interfaces 130-132 sends read responses and write responses on a single bus within routing network 120.

In various implementations, communication fabric 110 ("fabric") transfers traffic between CPU 160, GPU 162, and Multimedia Engine 166. Fabric 110 also transfers traffic between memories 150 and 152 and clients such as CPU 160, GPU 162 and Multimedia Engine 166. When network traffic includes network messages for obtaining requested data, one or more of interfaces 112, 114, 116, 130 and 132 and network switches 170-178 translate target addresses of requested data.

In various implementations, one or more of fabric 110 and routing network 120 include status and control registers and other storage elements for storing requests, responses, and control parameters. In some implementations, fabric 110 includes control logic for supporting communication, data transmission, and network protocols for routing traffic over one or more buses. In some implementations, fabric 110 includes control logic for supporting address formats, interface signals and synchronous/asynchronous clock domain usage.

In order to maintain full throughput, in some implementations each of the network switches 170-178 processes a number of packets per clock cycle equal to a number of read ports in the switch. In various implementations, the number of read ports in a switch is equal to the number of write ports in the switch. This number of read ports is also referred to as the radix of the network switch. When one or more of the network switches 170-178 processes a number of packets less than the radix per clock cycle, the bandwidth for routing network 120 is less than maximal. Therefore, the network switches 170-178 include storage structures and control logic for maintaining a rate of processing equal to the radix number of packets per clock cycle.

In some implementations, network switches 170-178 include centralized storage structures, rather than separate input and output storage structures. Centralized storage structures in one or more of network switches 170-178 avoid redundancy in buffering which leads to increases in both on-die area and power consumption. In addition, splitting storage structures into separate input and output storage structures leads to additional complexity in maintaining a local age of packets for their lifetime in the network switch. In contrast, network switches 170-178 store metadata corresponding to received packets in a single, centralized, collapsible queue where the age of a packet corresponds to its position in the queue. Therefore, the age of the packet is implicit and it is unnecessary to separately store age information for the packets. The payload data of the packets is stored in a separate memory structure so the relatively large amount of data is not shifted during a shift of the collapsible queue.

In some implementations, one or more of network switches 170-178 include control logic and circuitry that selects non-contiguous queue entries for deallocation in a single clock cycle. In order to maintain full throughput, the number of queue entries selected for deallocation is up to the radix of the network switch (i.e., the maximum number of packets that can be received by the switch in a single clock cycle). In addition to identifying queue entries for deallocation, the control logic also shifts the remaining queue entries (those that have not been deallocated) toward the head of the queue such that all remaining allocated queue entries are located in contiguous entries at the head of the queue. All queue entries available for allocation are then located in contiguous entries at the tail of the queue. In some implementations, the control logic in one or more of the network switches 170-178 performs the collapse of the queue within a single clock cycle.

Interfaces 112-116 are used for transferring data, requests and acknowledgment responses between routing network 120 and CPU 160, GPU 162 and Multimedia Engine 166. Interfaces 130-132 are used for transferring data, requests and acknowledgment responses between memory controllers 140-142 and routing network 120. In an implementation, interfaces 112-116 and 130-132 have mappings between address spaces and memory channels. In various implementations, interfaces 112-116 and 130-132 and memory controllers 140-142 include hardware circuitry and/or software for implementing algorithms to provide functionality.

Interfaces 112-116 support communication protocols with CPU 160, GPU 162 and Multimedia Engine 166. In some implementations, interfaces 112-116 include queues for storing requests and responses, and selection logic for arbitrating between received requests before sending requests to routing network 120. Interfaces 112-116 also include logic for generating packets, decoding packets, and supporting communication with routing network 120. In some implementations, each of interfaces 112-116 communicates with a single client as shown. In other implementations, one or more of interfaces 112-116 communicates with multiple clients and tracks traffic with a client using an identifier that identifies the client.

Although a single memory controller 140 is shown for memory 150 and a single memory controller 142 is shown for memory 152, in other implementations computing system 100 includes multiple memory controllers with each supporting one or more memory channels. Memory controllers 140-142 include queues for storing requests and responses. Additionally, memory controllers 140-142 include control logic for grouping requests to be sent to memories 150-152 and sending the requests to the memories 150-152 based on timing specifications of the memories 150-152 with support for burst modes.

Memory controllers 140-142 include status and control registers for storing control parameters. Additionally, memory controllers 140-142 include logic to reorder received memory access requests and responses for efficient out-of-order processing. The reordering is based on one or more of a priority level, a quality of service (QoS) parameter, an age of a packet for a memory access request or response, or other considerations.

In various implementations, memories 150-152 include any of a variety of random access memories (RAMs). In some implementations, memories 150-152 store data and corresponding metadata in synchronous RAMs (SRAMs). In other implementations, memories 150-152 store data and corresponding metadata in one of a variety of dynamic RAMs (DRAMs). For example, depending on the implementation, memories 150-152 store data in traditional DRAM or in multiple three-dimensional (3D) memory dies stacked on one another.

Figure 2:
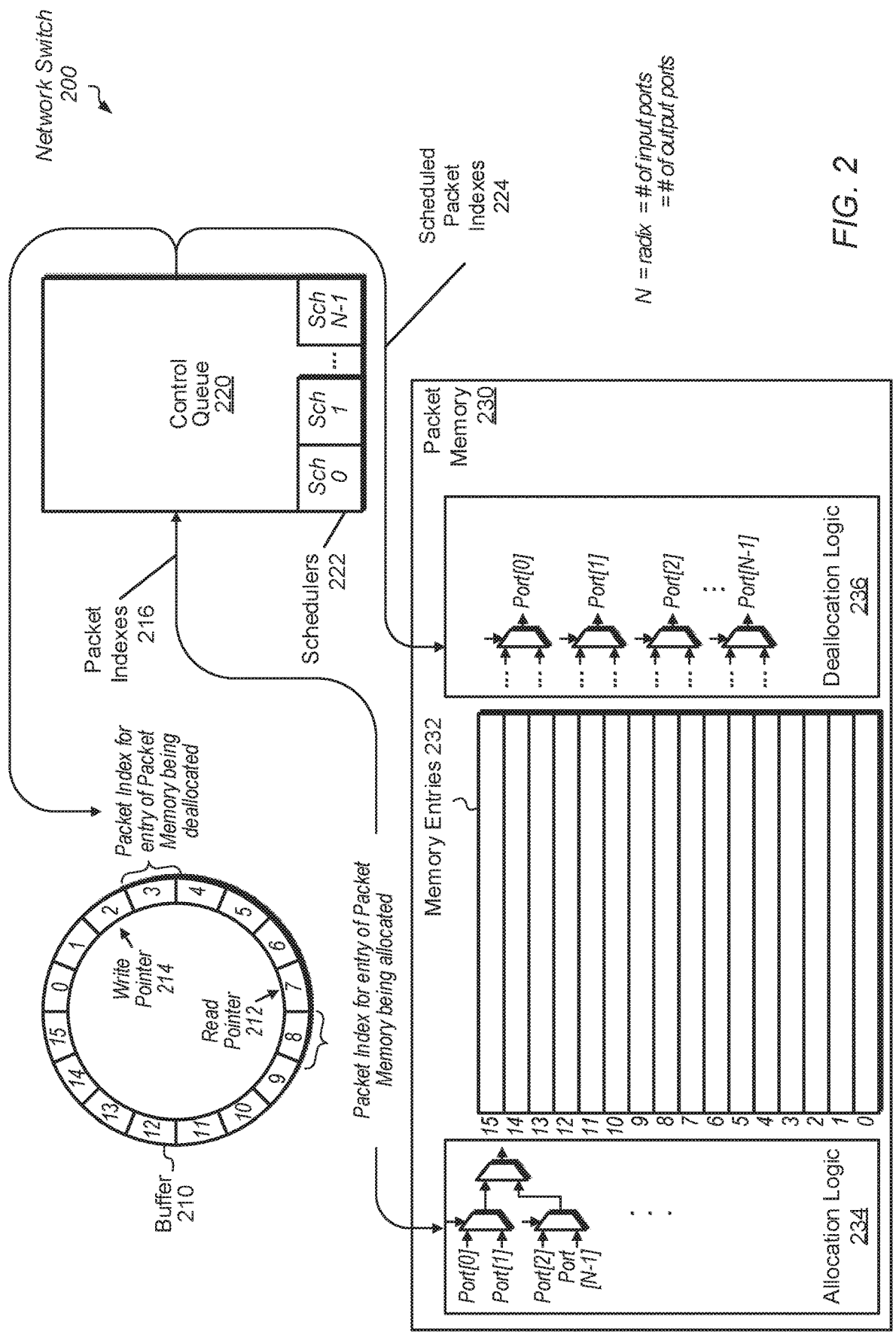
FIG. 2 is a block diagram of one implementation of a network on chip (NoC) switch.

Turning to FIG. 2, a generalized block diagram of one implementation of a network switch 200 is shown. Network switch 200 includes a buffer 210, control queue 220, and a packet memory 230. In various implementations, packet memory 230 stores packet payload data of received packets. Buffer 210 stores addresses of entries in the memory 232, which are also referred to as packet indexes. In the example shown, buffer 210 includes 16 entries (0-15). In an implementation, each packet index points to a particular one of the entries in memory 232. In such an implementation, packet memory 230 stores data in a direct-mapped organization. In other implementations, packet memory 230 stores data using another organization such as a set-associative or fully associative organization.

In some implementations, buffer 210 is managed as an in-order circular buffer. In some implementations, each of read pointer 212 and write pointer 214 is set to a same value (e.g., buffer entry 0) upon reset. In some implementations, the packet indexes stored in the buffer entries of buffer 210 are reset to values corresponding to the buffer entries. For example, the reset value of the index stored in buffer entry 0 is 0. Similarly, the reset value of the index stored in buffer entry 1 is 1, and so on. Although each of buffer 210 and packet memory 230 are shown to include 16 entries, in other implementations, each of buffer 210 and packet memory 230 include another number of entries.

When a packet is received by network switch 200, a packet index stored in a buffer entry pointed to by read pointer 212 is read out as packet index 216. In some implementations, multiple packets are simultaneously received and multiple packet indexes are read out of buffer 210 beginning with the packet index stored in a buffer entry pointed to by read pointer 212. In an implementation, the packet indexes 216 read out from the buffer 210 are sent to both allocation logic 234 in packet memory 230 and control queue 220. In some implementations, the number of packets received equals the number of packet indexes read out from buffer 210, which equals the number of ports of network switch 200. This number is referred to as the radix of network switch 200. In the illustrated implementation, the radix is the non-zero integer value N. In an implementation, read pointer 212 is incremented by the number of received packets.

In an implementation, allocation logic 234 uses multiplexers for determining which memory entries are being allocated. Other combinatorial logic is possible and contemplated. As shown, the data inputs of the multiplexers in allocation logic 234 receive the incoming packet payload data. The select lines of the multiplexers in allocation logic 234 receive decoded values of the packet indexes 216 retrieved from buffer 210. Decoders (not shown) decode the received packet indexes 216 for selecting memory entries 232 to be allocated. In various implementations, packet memory 230 uses SRAM for data storage. The packet payload data stored in packet memory 230 does not shift between memory entries, but remains in a selected memory entry until the packet payload data is read out for sending across the network.

Control queue 220 receives the packet indexes 216 and stores them in available entries of the control queue 220. In contrast to packet memory 230, the packet indexes 216 do not determine which queue entries are selected for allocation. In an implementation, packet memory 230 stores the payload data of received packets, whereas control queue 220 stores metadata of received packets. In various implementations, control queue 220 is a collapsible queue. In contrast to the in-order buffer 210, control queue 220 does not necessarily select queue entries for deallocation in an in-order manner. Instead, control queue 220 selects packets in any desired order. The selection is based on one or more of a priority level, a quality of service (QoS) parameter, an age of a packet, and so forth. In some implementations, control queue 220 includes one scheduler per port of network switch 200. Therefore, control queue 220 includes a radix number N (where N is an integer) of schedulers 222.

In some implementations, the data stored in the queue entries of queue 220 are stored in an in-order contiguous manner according to age. For example, in an implementation, the data for the oldest packets are stored in contiguous allocated queue entries located beginning at the head of control queue 220. Queue entries storing invalid information that are available for allocation are located at the tail of control queue 220 following allocated entries. The received packet indexes 216 are stored in available queue entries along with one or more of a client identifiers of the source and destination for the packet, priority levels or QoS parameters, a data size of the packet, and so forth. In some implementations, an indication of age is not stored in the queue entries of control queue 220. Rather, in some implementations the age is implied by the location of the queue entry with entries nearer the head of the queue being older than entries nearer the tail of the queue.

When one or more schedulers 222 select packets to process and send on the network, schedulers 222 send the scheduled packet indexes 224 stored in the selected queue entries to each of buffer 210 and packet memory 230. Buffer 210 stores the packet indexes 224 in buffer entries in an in-order manner beginning with the buffer entry pointed to by write pointer 214. Write pointer 214 is incremented by the number of packet indexes 224 received. When full throughput is being achieved, the number of packet indexes 224 received equals the radix N of network switch 200.

Deallocation logic 236 receives scheduled packet indexes 224 and selects the corresponding memory entries. Decoders (not shown) decode the scheduled packet indexes 224 for selecting memory entries to deallocate. In an implementation, deallocation logic 236 uses multiplexers for determining which memory entries are being deallocated. Other combinatorial logic is possible and contemplated. As shown, the data inputs of the multiplexers in allocation logic 236 receive the data in the memory entries. The select lines of the multiplexers in deallocation logic 236 receive decoded values of the scheduled packet indexes 224. The packet payload data is sent out of network switch 200 to be routed on the network to its destination.

When packets are received and transmitted by network switch 200, interface logic (not shown) manages communication protocols. In an implementation, interfaces (not shown) between buffer 210, control queue 220 and packet memory 230 include wires with one or more buffers to transmit and receive data. In an implementation, no sequential elements are used between buffer 210, control queue 220 and packet memory 230, since packets are processed within a clock cycle. Therefore, schedulers 222 select queue entries of control queue 220, and within a clock cycle, the selected queue entries are deallocated, the corresponding memory entries in packet memory 230 are deallocated, buffer entries in buffer 210 are updated, and write pointer 214 is updated. Additionally, within the clock cycle, control queue 220 shifts remaining allocated queue entries toward an end of the queue such that the remaining allocated queue entries are located in a contiguous manner in control queue 220.

In various implementations, schedulers 222 select any queue entries in control queue 220. Therefore, selected queue entries are sparse queue entries. Two contiguous queue entries are located adjacent to one another, whereas two sparse queue entries have one or more other queue entries located between them. Therefore, two sparse queue entries selected for deallocation have one or more allocated queue entries between them that are not selected for deallocation.

In order to maintain full throughput, the number of queue entries selected for deallocation equals (up to) the radix N of network switch 200. In one example, N is 4. In such an example, schedulers 222 select 4 sparse queue entries for deallocation in control queue 220. Control logic (not shown) in control queue 220 finds and deallocates each of the selected queue entries. Within a single clock cycle, the control logic also shifts remaining allocated queue entries toward the head of the control queue 220 such that the remaining allocated queue entries are contiguous. In some implementations, the control logic in control queue 220 performs the collapse within a clock cycle and with a delay comparable to a propagation delay through N 2:1 multiplexers. Therefore, the control logic for collapsing control queue 220 is scalable. It is noted that although the components 210, 220 and 230 are described with respect to a network switch, in other implementations one or more of the components 210, 220 and 230 are also used outside of a network switch. For example, in some implementations the one more components include a processor core, a communication fabric, a memory controller, another client within the SOC, and so forth. Therefore, the further descriptions provided in FIGS. 3-9 also apply to circuitry and hardware/software control logic external to a network switch.

Figure 3:
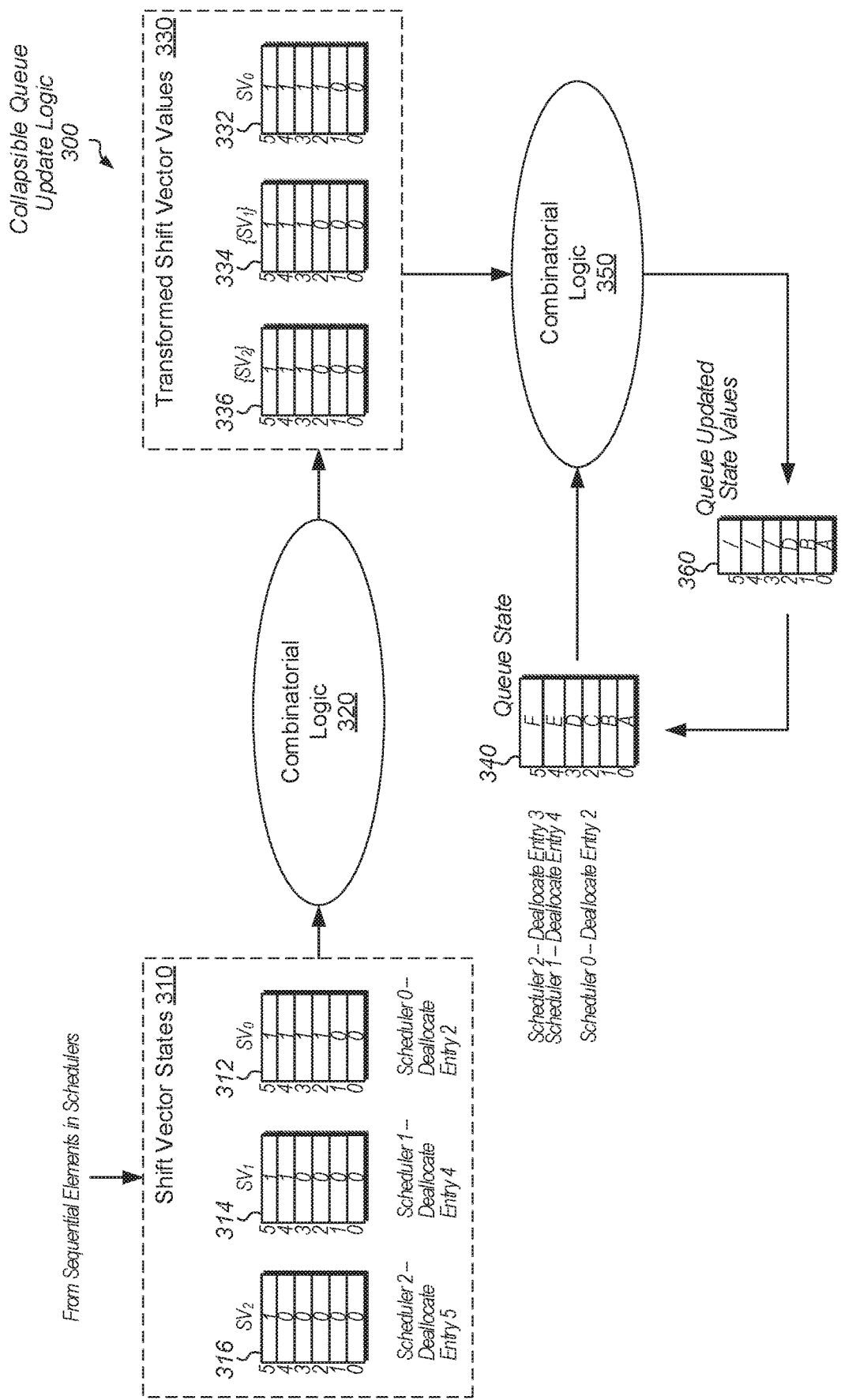
FIG. 3 is a flow diagram of one implementation of a method for managing throughput of a network switch.

Turning now to FIG. 3, a generalized block diagram of one implementation of collapsible queue update logic 300 is shown. In the example shown, collapsible queue update logic 300, also referred to as logic 300, includes shift vector states 310 received from schedulers. For example, in an implementation, the shift vector states 310 are outputs of sequential elements in schedulers such as schedulers 222 (of FIG. 2). In the illustrated implementation, the radix N of the network switch is 3. Accordingly, shift vector states 310 includes three shift vectors-$SV_0$ 312, $SV_1$ 314 and $SV_2$ 316. As shown, each of shift vector states 312-316 is a 6-bit vector. Combinatorial logic 320 receives shift vector states 310 and generates modified shift vector states 330, which includes shift vector states 332-336. As shown, shift vector state 332 is the same as shift vector state 312. However, shift vector states 334 and 336 are different than shift vector states 314 and 316.

Combinatorial logic 350 receives the shift vector states 330. Additionally, combinatorial logic 350 receives queue state 340. Queue state 340 are the outputs of queue entries in a collapsible queue. In the illustrated implementation, the collapsible queue includes 6 entries. Queue entry 0 stores data "A," queue entry 1 stores data "B," and so forth. Queue entries 0-5 store data A to F. Combinatorial logic 350 generates the queue updated state values 360 based on the received inputs. In an implementation, queue updated state values 360 are sent to the collapsible queue to be stored after reordering. In various implementations, the propagation delay from receiving shift vector states 310 from external schedulers to sending the queue updated state values 360 to the collapsible queue for storage is a single clock cycle.

External schedulers select queue entries to deallocate in a queue. In some implementations, these external schedulers also generate a bit vector including both a first segment of bits, each bit storing a first value, and a second segment of bits, each bit storing a second value. In various implementations, where the first segment and the second segment meet in the bit vector indicates the selected queue entry for deallocation. For example, shift vector 312, which is also referred to as shift vector $SV_0$, is a bit vector with 6 bits. A first segment of shift vector 312 includes 2 bits at bit positions 0 and 1, each storing a binary value 0. A second segment of shift vector 312 includes 4 bits at bit positions 2-5, each storing a binary value 1. In this example, shift vector 312 indicates queue entry 2 is to be deallocated. Therefore, queue entry 2 storing data C is to be deallocated.

A first segment of shift vector 314 includes 4 bits at bit positions 0-3, each storing a binary value 0. A second segment of shift vector 314 includes 2 bits at bit positions 4-5, each storing a binary value 1. In this example, shift vector 314 indicates queue entry 4 is to be deallocated. Therefore, queue entry 4 storing data E is to be deallocated. Shift vector 314 is also referred to as shift vector $SV_1$. In a similar manner, shift vector 316 indicates queue entry 5 is to be deallocated. Therefore, queue entry 5 storing data F is to be deallocated. Shift vector 316 is also referred to as shift vector $SV_2$.

As shown, combinatorial logic 320 does not modify shift vector 312. In an implementation, shift vector 332 has the same values in its 6-bit vector as shift vector 312. Combinatorial logic 320 does modify shift vector 314. Shift vector 314 is also referred to as $SV_1$. Shift vector 334 is also referred to as $\{SV_1\}$. In various implementations, combinatorial logic 320, which is also referred to as logic 320, generates a transformed shift vector 334 by shifting each bit position in shift vector 314 toward a least significant bit position by an amount based on values stored in shift vector 312. For example, the value $SV_0[0]$ is binary 0, and therefore, $\{SV_1\}[0]$ has the same value as $SV_1[0]$, which is 0.

In a similar manner as above, the value $SV_0[1]$ is binary 0, and therefore, $\{SV_1\}[1]$ has the same value as $SV_1[1]$, which is 0. Continuing to move to higher bit positions, the value $SV_0[2]$ is binary 1, and therefore, $\{SV_1\}[2]$ has the same value as $SV_1[3]$, rather than $SV_1[2]$. The value of each of $SV_1[3]$ and $\{SV_1\}[2]$ is 0. Therefore, $\{SV_1\}[2]$ obtains the value of binary 0, but for different conditions than for $SV_1[0]$ and $SV_1[1]$. Continuing to move to higher bit positions, the value $SV_0[3]$ is binary 1, and therefore, $\{SV_1\}[3]$ has the same value as $SV_1[4]$, rather than $SV_1[3]$. The value of $SV_1[4]$ is 1. Therefore, $\{SV_1\}[3]$ has the value 1.

Continuing still to move to higher bit positions, the value $SV_0[4]$ is binary 1, and therefore, $\{SV_1\}[4]$ has the same value as $SV_1[5]$, rather than $SV_1[4]$. The value of $SV_1[5]$ is 1. Therefore, $\{SV_1\}[4]$ has the value 1. Finally, the value $SV_0[5]$ is binary 1, and therefore, $\{SV_1\}[5]$ has a given value provided. In some implementations, the value is the same as $SV_1[5]$. The value of $SV_1[5]$ is 1.Therefore, $\{SV_1\}[5]$ has the value 1. Logic 320 performs similar steps to generate transformed shift vector values 336, which is also referred to as $\{SV_2\}$. However, logic 320 uses values stored in each of $\{SV_1\}$ and $SV_0$, rather than $SV_0$ alone. Therefore, logic 320 generates values for transformed shift vector $\{SV_1\}$ based on both values stored in one other received bit vector (i.e., $SV_0$) and values stored in one other transformed bit vector (i.e., $\{SV_1\}$).

In some implementations, logic 320 uses the following steps to generate transformed shift vector $\{SV_2\}$. The value $\{SV_1\}[0]$ is binary 0, and so, $SV_0[0]$ is checked, rather than $SV_0[1]$. The value of $SV_0[0]$ is binary 0, and therefore, $\{SV_2\}[0]$ has the same value as $SV_2[0]$, which is 0. Next, the value $\{SV_1\}[1]$ is binary 0, and so, $SV_0[1]$ is checked, rather than $SV_0[2]$. The value of $SV_0[1]$ is binary 0, and therefore, $\{SV_2\}[1]$ has the same value as $SV_2[1]$, which is 0. Following, the value $\{SV_1\}[2]$ is binary 0, and so, $SV_0[2]$ is checked, rather than $SV_0[3]$. The value of $SV_0[2]$ is binary 1, and therefore, $\{SV_2\}[2]$ has the same value as $SV_2[3]$, which is 0, rather than the value of $SV_2[2]$. In a similar manner, the values for $\{SV_2\}[3:5]$ are generated.

As shown above, when generating the shift vector 314, which is $\{SV_1\}[0:5]$, each bit position is assigned a value in a same bit position as $SV_1[0:5]$ or it is assigned a value in one incremented bit position based on a corresponding value of $SV_0[0:5]$ stored in a same bit position. When generating the shift vector 316, which is $\{SV_2\}[0:5]$, each bit position is assigned a value in a same bit position as $SV_2[0:5]$ or it is assigned a value in one of the next two incremented bit positions based on corresponding values of $\{SV_1\}[0:5]$ and $SV_0[0:5]$.

Logic 350 receives the transformed bit vector values 330 and transforms the positions of the values of queue state 340 in a similar manner as described above. The result is shown as queue update state values 360. As shown, queue entries 2, 4 and 5 have been deallocated and the queue entries have been collapsed. The backslash "/" shown in the queue entries indicates available queue entries for allocation.

Figure 4:
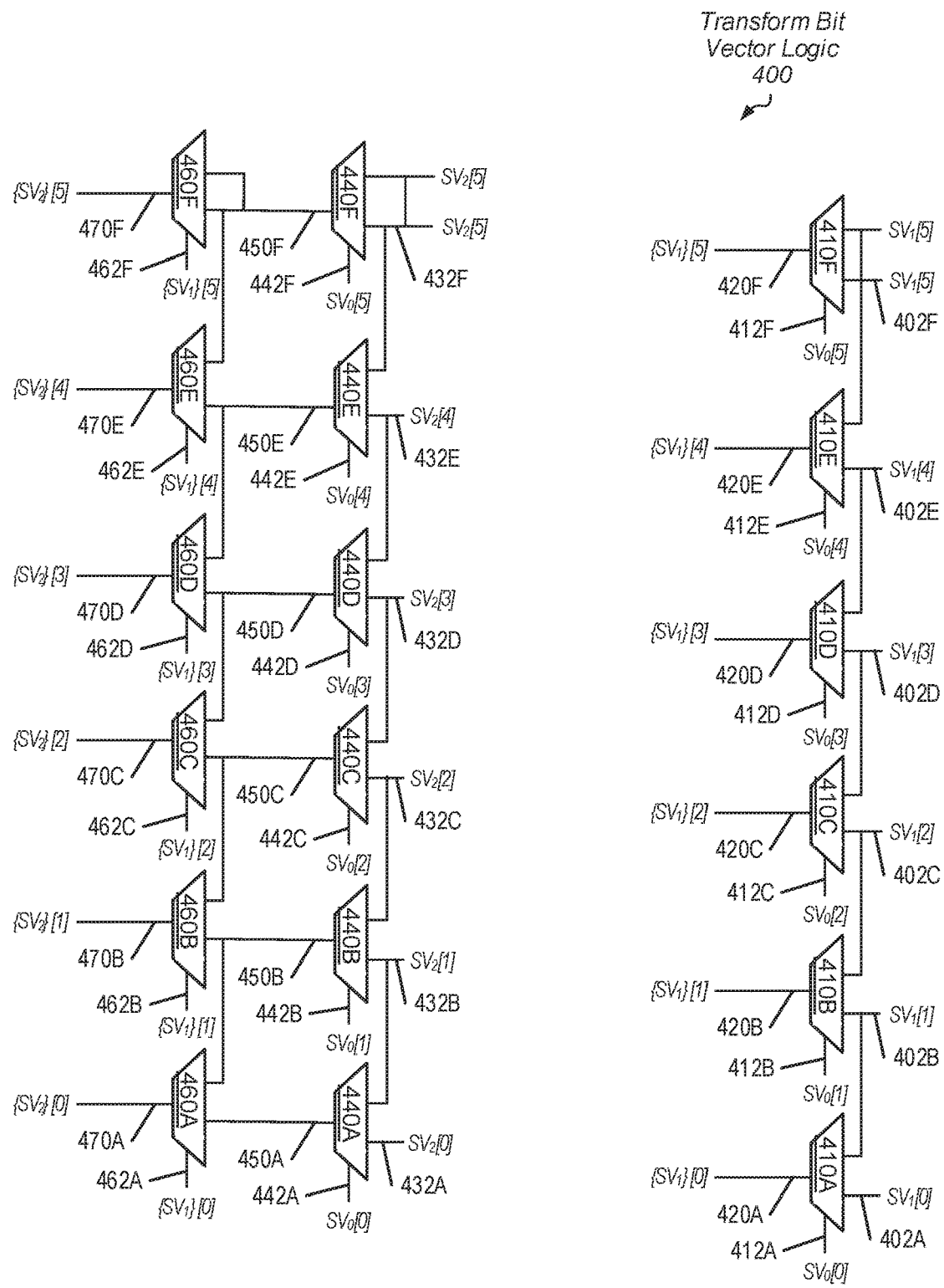
FIG. 4 is a block diagram of one implementation of collapsible queue update logic.

Turning now to FIG. 4, a generalized block diagram of one implementation of transform bit vector logic 400 is shown. Transform bit vector logic 400 is also referred to as logic 400. In an implementation, logic 400 is used as logic 320 (of FIG. 3). As shown, multiplexers 410A-410F receive a bit vector $SV_1[0:5]$ on data input lines 402A-402F. Multiplexers 410A-410F receive a different bit vector $SV_0[0:5]$ on select input lines 412A-412F. Multiplexers 410A-410F provide the transformed bit vector $\{SV_1\}[0:5]$ on the output lines 420A-420F.

As shown, multiplexers 440A-440F receive a bit vector $SV_2[0:5]$ on data input lines 432A-432F. Multiplexers 410A-410F receive a different bit vector $SV_0[0:5]$ on select input lines 442A-442F. Multiplexers 440A-440F provide an intermediate bit vector on the output lines 450A-450F, which are sent as data inputs to multiplexers 460A-460F. Multiplexers 460A-460F receive the transformed bit vector $\{SV_1\}[0:5]$ on select input lines 462A-462F. Multiplexers 460A-460F provide the transformed bit vector $\{SV_2\}[0:5]$ on the output lines 470A-470F.

Figure 5:
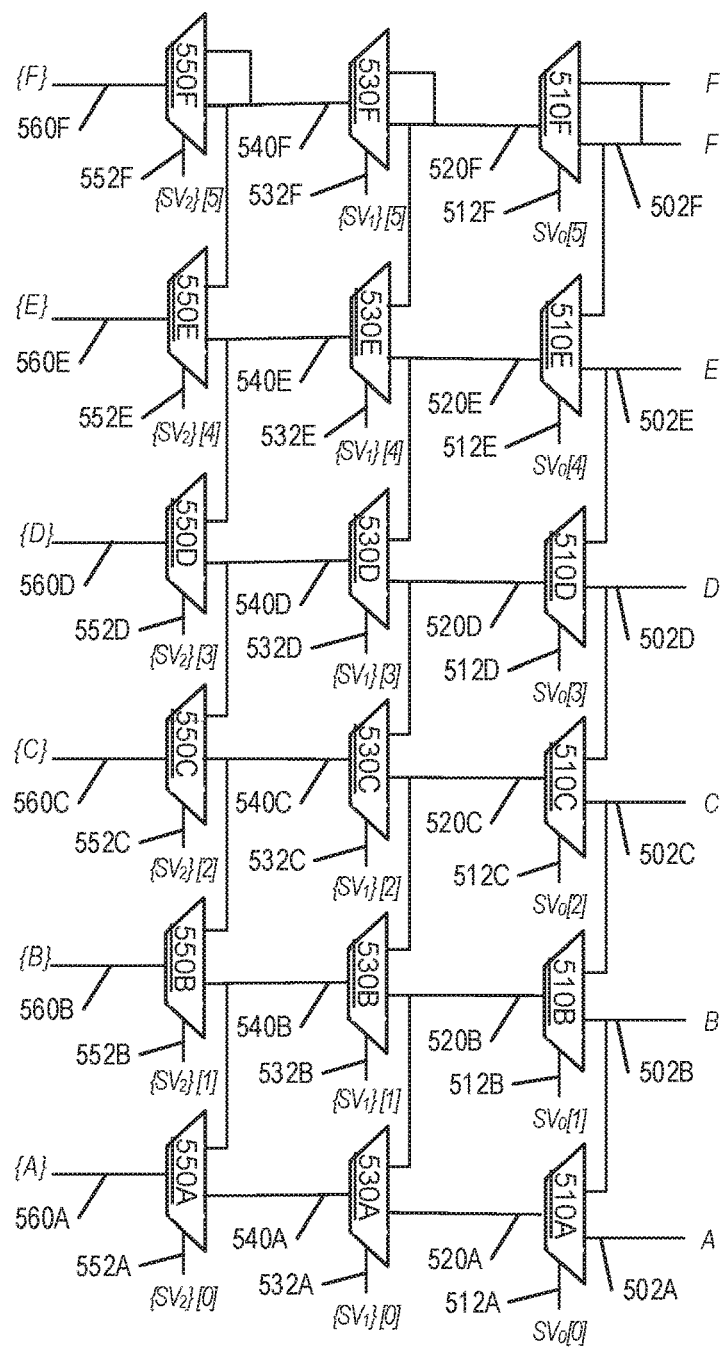
FIG. 5 is a block diagram of one implementation of transform bit vector logic.

Turning now to FIG. 5, a generalized block diagram of one implementation of transform queue entry logic 500 is shown. Transform queue entry logic 500 is also referred to as logic 500. In an implementation, logic 500 is used as logic 350 (of FIG. 3). As shown, multiplexers 510A-510F receive a bit vector, which includes a bit from each of data A-F stored in queue entries. The data size of data A-F can be one of a variety of data sizes stored in a queue. The actual bit position is not shown, since, in an implementation, logic 500 is replicated for each bit stored in the queue entries. A bit from each of data A to F is received on data input lines 502A-502F. Multiplexers 510A-510F receive bit vector $SV_0[0:5]$ on select input lines 512A-512F. Multiplexers 510A-510F provide an intermediate bit vector on the output lines 520A-520F, which are sent as data inputs to multiplexers 530A-530F.

Multiplexers 530A-530F receive the transformed bit vector $\{SV_1\}[0:5]$ on select input lines 532A-532F. Multiplexers 530A-530F provide an intermediate bit vector on the output lines 540A-540F, which are sent as data inputs to multiplexers 550A-550F. Multiplexers 550A-550F receive the transformed bit vector $\{SV_2\}[0:5]$ on select input lines 552A-552F. Multiplexers 550A-550F provide the transformed bit vector $\{A\}$ to $\{F\}$ on the output lines 560A-560F.

Figure 6:
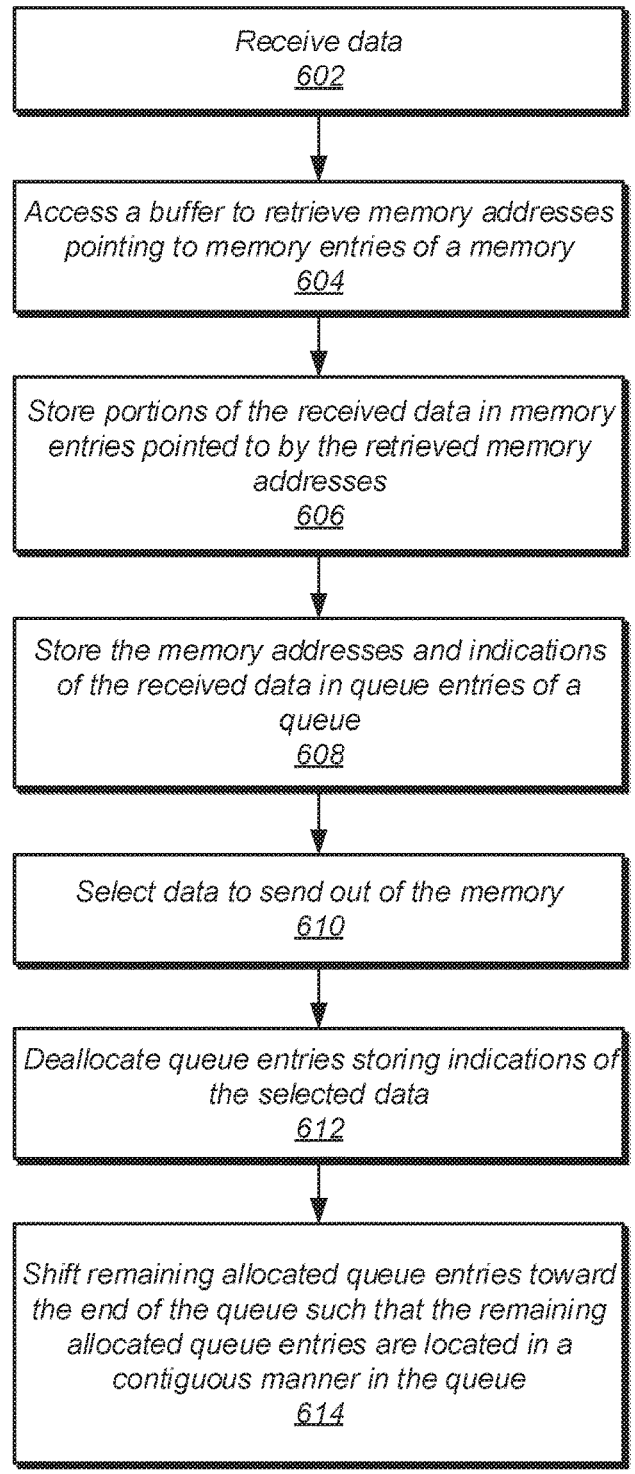
FIG. 6 is a block diagram of one implementation of transform queue entry logic.

Referring now to FIG. 6, one implementation of a method 600 for managing throughput of a network on chip switch is shown. For purposes of discussion, the steps in this implementation (as well as in FIGS. 7-8) are shown in sequential order. However, it is noted that in various implementations of the described methods, one or more of the elements described are performed concurrently, in a different order than shown, or are omitted entirely. Other additional elements are also performed as desired. Any of the various systems or apparatuses described herein are configured to implement method 600.

In various implementations, a communication fabric transfers traffic between one or more clients and one or more memory controllers. In various implementations, the communication fabric includes status and control registers and other storage elements for queuing requests and responses and storing control parameters. In various implementations, the communication fabric includes control logic for following one or more communication and network protocols, and efficiently routing traffic between sources and destinations on one or more buses. To efficiently route traffic, in various implementations, the communication fabric also uses multiple network on chip (NoC) switches.

A NoC switch receives data (block 602). In various implementations, the received data are network messages. In some implementations, the fabric uses the NoC switches in a point-to-point (P2P) ring topology. In other implementations, the communication fabric uses NoC switches with programmable routing tables in a cluster topology. In yet other implementations, the communication fabric uses NoC switches in a combination of topologies. The NoC switch includes a buffer, which is accessed to retrieve memory addresses (block 604). In some implementations, the buffer is an in-order circular buffer.

Portions of the received data, such as packet payload data, are stored in entries of a memory pointed to by the retrieved memory addresses (block 606). The memory addresses and indications of the received data (i.e., network messages) are stored in queue entries of a queue (block 608). Messages to send out of the memory and on the network are selected (block 610). In some implementations, within a clock cycle, queue entries storing indications of the selected messages are deallocated (block 612). Within the clock cycle, remaining allocated queue entries are shifted toward the end of the queue such that the remaining allocated queue entries are located in a contiguous manner in the queue (block 614).

Figure 7:
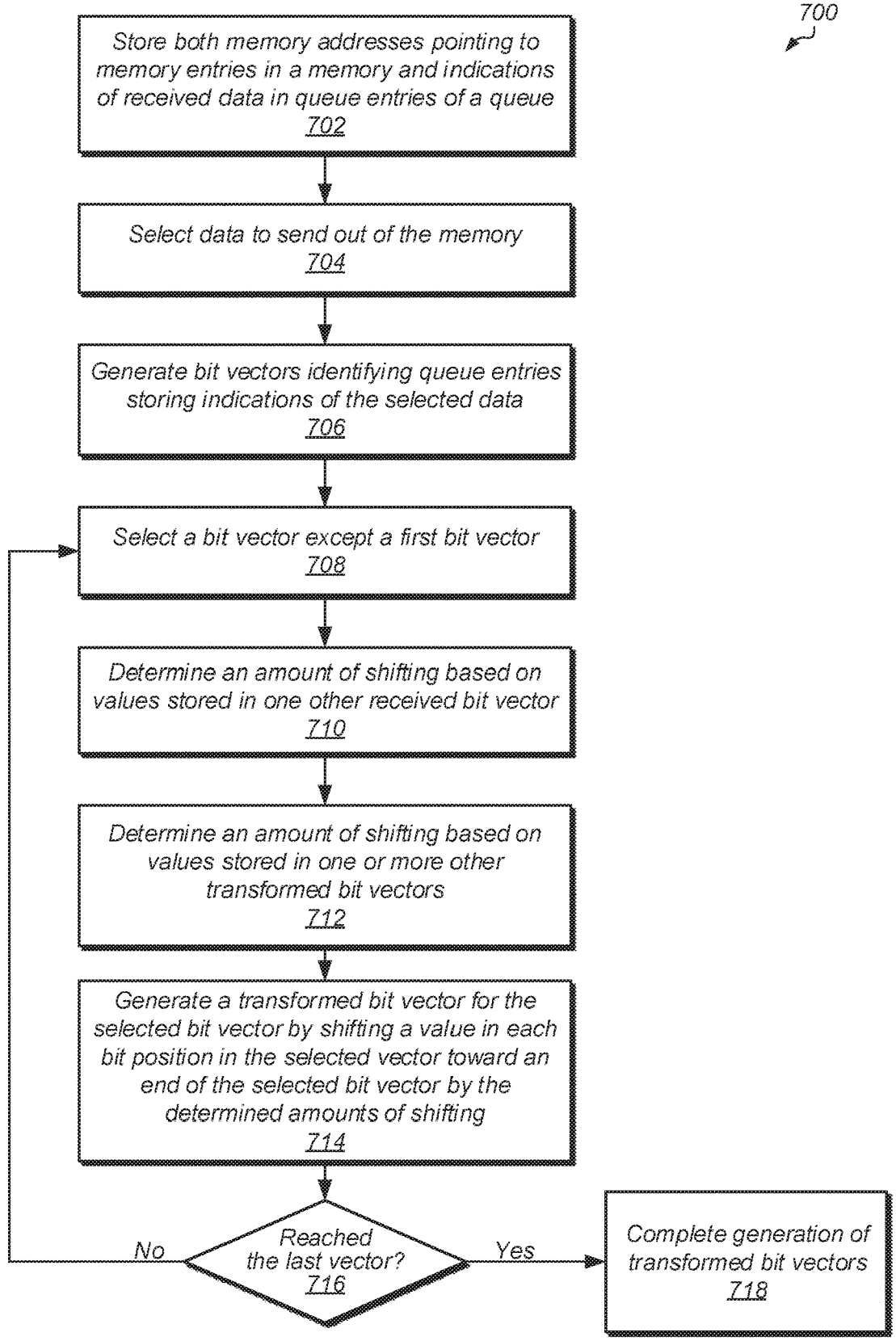
FIG. 7 is a flow diagram of one implementation of a method for determining shift amounts for collapsing a queue.

Referring now to FIG. 7, one implementation of a method 700 for determining shift amounts for collapsing a queue is shown. Memory addresses and indications of received messages are stored in queue entries of a queue (block 702). Messages to send on the network are selected (block 704). Bit vectors are generated (block 706). In various implementations, the generated bit vectors identify queue entries storing indications of the selected messages. A bit vector except a first bit vector is selected (block 708). Referring to earlier examples, the bit vector $SV_0[0:5]$ was not selected for later transformation.

An amount of shifting is determined based upon values stored in one other generated bit vector (block 710). For example, the bit vector $SV_0[0:5]$ is sent to select lines of multiplexers as shown earlier in logic 400 (of FIG. 4). An amount of shifting is also determined based upon values stored in one or more other transformed bit vectors (block 712). For example, the transformed bit vector $\{SV_0\}[0:5]$ is sent to select lines of multiplexers as shown earlier in logic 400 (of FIG. 4). A transformed bit vector is generated for the selected bit vector (block 714).

In various implementations, the transformed bit vector is created by shifting each bit position in the selected bit vector toward a least significant bit position by the determined amount. In other implementations, values are shifted for each bit position toward the most significant bit position. If the last vector is not reached ("no" branch of the conditional block 716), then control flow of method 700 returns to block 708 where a vector except a first vector is selected. If the last vector is reached ("yes" branch of the conditional block 716), then generation of transformed bit vectors is completed (block 718). In some implementations, the generation of transformed bit vectors is performed within a single clock cycle.

Figure 8:
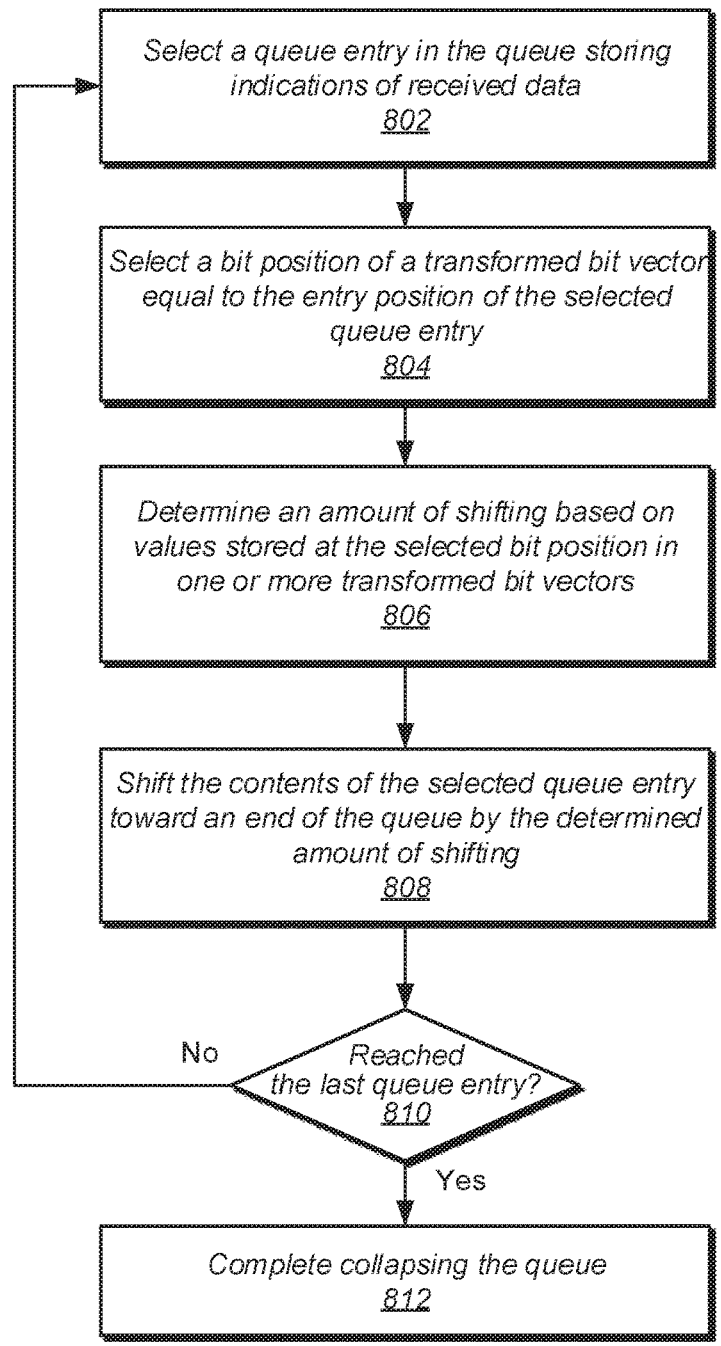
FIG. 8 is a flow diagram of one implementation of a method for collapsing a queue.

Referring now to FIG. 8, one implementation of a method 800 for collapsing a queue is shown. A queue entry in the queue storing indications of received network messages is selected (block 802). A bit position equal to the position of the queue entry in the queue is selected (block 804). An amount of shifting is determined based upon values stored at the selected bit position in each of the transformed bit vectors (block 806). For example, logic 500 (of FIG. 5) receives an unmodified bit vector and one or more transformed bit vectors on select lines of multiplexers for determining how many bit positions to shift bits of data stored in queue entries. The number of transformed bit vectors to use is based on the radix of the network switch, which is the maximum number of queue entries to deallocate from the queue.

The contents of the selected queue entry are shifted toward an end of the queue by the determined amount (block 808). If the last queue entry is not reached ("no" branch of the conditional block 810), then control flow of method 800 returns to block 802 where another queue entry is selected. If the last queue entry is reached ("yes" branch of the conditional block 810), then collapsing of the queue is completed (block 812). In some implementations, the collapsing of the queue is performed within a single clock cycle.

Figure 9:
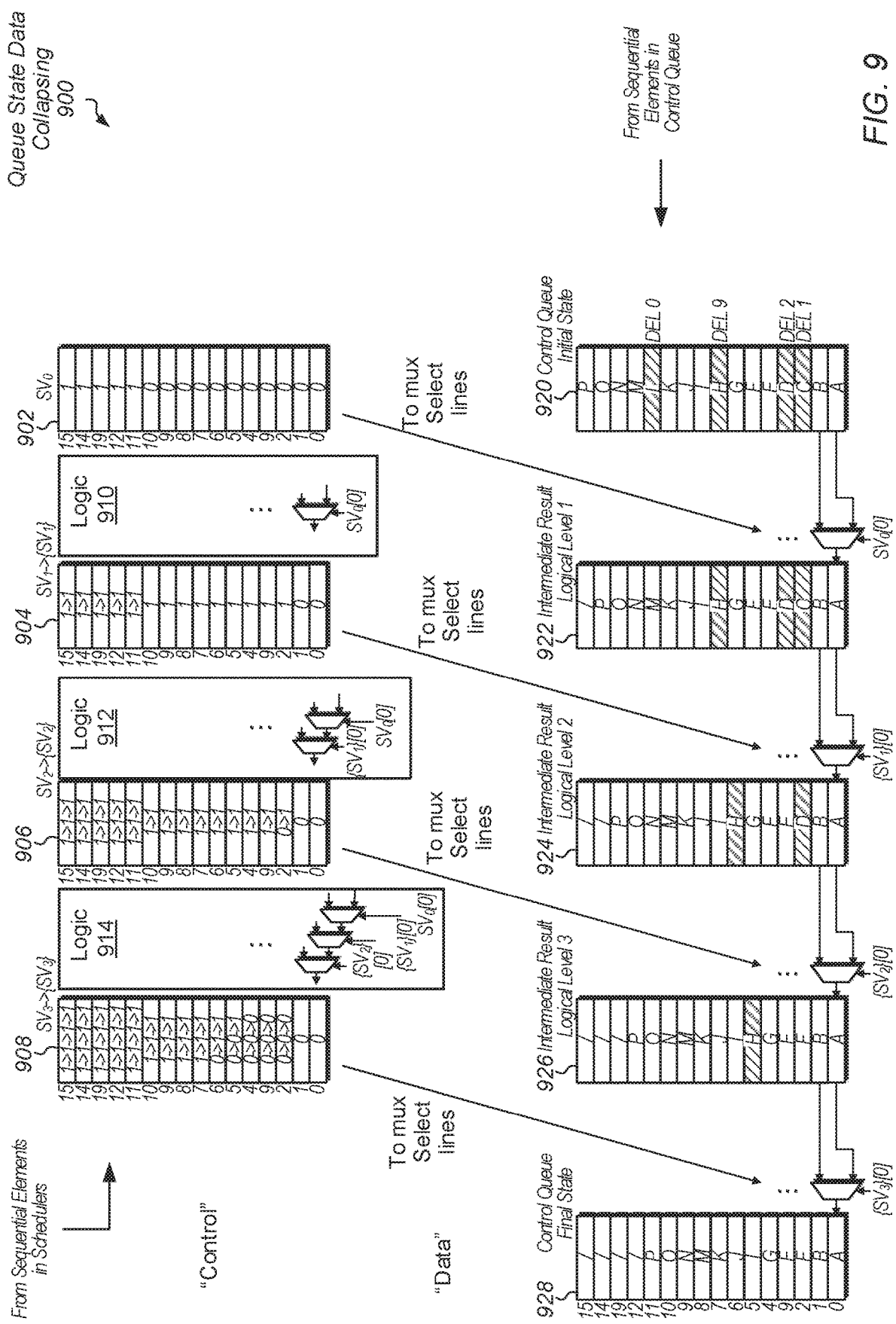
FIG. 9 is a block diagram of one implementation of queue state information collapsing.

Turning now to FIG. 9, a generalized block diagram of another implementation of collapsible queue update logic 900 is shown. As shown, the radix is 4, rather than 3 as in previous examples. Bit vectors 902-908 are received from sequential elements in external schedulers. Logic 910-914 illustrate the same type of multiplexing selection logic as shown earlier for logic 400 (of FIG. 4), but in a distributed manner. For example, logic 910 is used to transform bit vector 904. The transition from bit vector 904 to its transformed bit vector due to logic high values in bit vector $SV_0[0:15]$ are shown with an arrow symbol "→" in the bit vector 904. Similar transitions caused by logic high values on select lines of multiplexers are shown in bit vectors 906 and 908.

The initial state of the external control queue is shown in state 920. The intermediate transformations, which will cause the queue to collapse, are shown in intermediate results 922-926. The multiplexers between the intermediate results 922-926 illustrate the same type of multiplexing selection logic as shown earlier for logic 500 (of FIG. 5), but in a distributed manner. The final state of the control queue is shown in state 928. The values stored in state 928 are sent to the sequential elements in the external control queue. As shown, the intermediate results 922-926 are generated simultaneously as the bit vectors 904-908 are being transformed. In various implementations, the collapse of the queue occurs within a clock cycle and with a delay comparable to a propagation delay through N 2:1 multiplexers, where N is a non-zero integer equal to the radix of the network switch. Therefore, the control logic for collapsing the queue is scalable.

In various implementations, program instructions of a software application are used to implement the methods and/or mechanisms previously described. The program instructions describe the behavior of hardware in a high-level programming language, such as C. Alternatively, a hardware design language (HDL) is used, such as Verilog.

The program instructions are stored on a non-transitory computer readable storage medium. Numerous types of storage media are available. The storage medium is accessible by a computing system during use to provide the program instructions and accompanying data to the computing system for program execution. The computing system includes one or more memories and one or more processors for executing program instructions.

It should be emphasized that the above-described implementations are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A queue comprising circuitry in a network switch, the queue comprising:
   a plurality of queue entries configured to store data in an in-order contiguous manner beginning at a first available entry nearest a head of the queue;
   control logic; and
   a plurality of schedulers comprising circuitry, wherein each of the plurality of schedulers is configured to:
      select a queue entry of the plurality of queue entries for deallocation; and
      generate a bit vector comprising a plurality of bits with a single bit transition, wherein a location of the bit transition in the bit vector identifies the queue entry selected for deallocation; and
   wherein in response to receiving a plurality of bit vectors from the plurality of schedulers that identify at least two non-contiguous entries of the plurality of queue entries, the control logic is configured to:
      deallocate each of the at least two non-contiguous entries; and
      shift queue entries that remain allocated toward the head of the queue such that entries that remain allocated are located in contiguous entries beginning at the head of the queue.

2. The queue as recited in claim 1, wherein the queue further comprises an integer number N of read ports and N write ports, and a number of selected queue entries to deallocate equals N.

3. The queue as recited in claim 2, wherein the selected queue entries are selected for deallocation by the plurality of schedulers in an out-of-order manner with respect to a quality of service (QoS) parameter.

4. The queue as recited in claim 3, wherein the data are stored in the plurality of queue entries in the in-order manner with respect to age.

5. The queue as recited in claim 1, wherein the control logic is further configured to generate a transformed bit vector for a received bit vector by shifting each bit position in the received bit vector toward a least significant bit position by an amount based on values stored in one other received bit vector.

6. The queue as recited in claim 5, wherein the amount is further based on values stored in one other transformed bit vector.

7. The queue as recited in claim 5, wherein a queue entry in the queue at a given position in the queue is shifted toward the head of the queue based on a value stored at a bit position of a transformed bit vector that is equal to the given position.

8. The queue as recited in claim 1, wherein:
   the queue further comprises a first interface to a memory configured to store data corresponding to the data stored in the queue; and
   the control logic is further configured to send memory addresses stored in the selected queue entries to the memory for reading out data.

9. The queue as recited in claim 8, wherein:
   the queue further comprises a second interface to an in-order circular buffer comprising circuitry configured to store memory addresses identifying entries in a memory; and
   the control logic is further configured to send, via the second interface, memory addresses stored in selected queue entries to the circular buffer for updating entries of the circular buffer used to identify memory entries to allocate.

10. The queue as recited in claim 9, wherein the control logic is further configured to:
   receive, via the second interface, memory addresses stored in the circular buffer that identify entries of the memory being allocated; and
   store the received memory addresses in available queue entries.

11. A method, comprising:
   storing, in a plurality of queue entries of a queue comprising circuitry within a network switch, data in an in-order contiguous manner beginning at a first available entry nearest a head of the queue;
   selecting, by a plurality of schedulers comprising circuitry, queue entries of the plurality of queue entries for deallocation;
   generating, by the plurality of schedulers, a plurality of bit vectors, each bit vector comprising a plurality of bits with a single bit transition, wherein a location of the bit transition in the bit vector identifies the queue entry selected for deallocation;
   in response to receiving a plurality of bit vectors from the plurality of schedulers that identify at least two non-contiguous entries of the plurality of queue entries:
      deallocating, by control logic in the queue, each of the at least two non-contiguous entries; and
      shifting, by the control logic, queue entries that remain allocated toward the head of the queue such that entries that remain allocated are located in contiguous entries beginning at the head of the queue.

12. The method as recited in claim 11, further comprising generating a transformed bit vector for a received bit vector by shifting each bit position in the received bit vector toward a least significant bit position by an amount based on values stored in one other received bit vector.

13. The method as recited in claim 12, wherein the amount is further based on values stored in one other transformed bit vector.

14. The method as recited in claim 12, further comprising shifting, by the control logic in the queue, a queue entry in the queue at a given entry position toward the head of the queue based on a value stored at a bit position of a transformed bit vector that is equal to the given position.

15. The method as recited in claim 14, further comprising sending memory addresses stored in the selected queue entries to a memory for reading out data.

16. A network switch comprising:
a queue, comprising circuitry, comprising a plurality of queue entries configured to store data in an in-order contiguous manner beginning at a first available entry nearest a head of the queue;
a memory configured to store data corresponding to the data stored in the queue;
an in-order circular buffer comprising circuitry configured to manage memory addresses identifying entries in the memory;
wherein the queue is configured to:
  select a queue entry of the plurality of queue entries for deallocation; and
  generate a bit vector comprising a plurality of bits with a single bit transition, wherein a location of the bit transition in the bit vector identifies the queue entry selected for deallocation; and
  in response to receiving a plurality of bit vectors from the plurality of schedulers comprising circuitry that identify at least two non-contiguous entries of the plurality of queue entries:
  deallocate each of the at least two non-contiguous entries; and
  shift queue entries that remain allocated toward the head of the queue such that entries that remain allocated are located in contiguous entries beginning at the head of the queue.

17. The network switch as recited in claim 16, wherein the queue is further configured to generate a transformed bit vector for a received bit vector by shifting each bit position in the received bit vector toward a least significant bit position by an amount based on values stored in one other received bit vector.

18. The network switch as recited in claim 17, wherein the amount is further based on values stored in one other transformed bit vector.

19. The network switch as recited in claim 17, wherein the queue is further configured to shift a queue entry in the queue at a given position toward the head of the queue based on a value stored at a bit position of a transformed bit vector that is equal to the given position.

20. The network switch as recited in claim 17, wherein the queue is further configured to send memory addresses stored in the selected queue entries to the memory for reading out data.

* * * * *